United States Patent [19]

Pirchl

[11] Patent Number: 5,680,757
[45] Date of Patent: Oct. 28, 1997

[54] HEAT SHIELD DEVICE

[76] Inventor: Gerhard Pirchl, Seestrase 341, 5708 Birrwil, Switzerland

[21] Appl. No.: 574,649

[22] Filed: Dec. 19, 1995

[30] Foreign Application Priority Data

Dec. 19, 1994 [DE] Germany ............ 44 45 118.0

[51] Int. Cl.$^6$ ............................ F01N 3/10
[52] U.S. Cl. ............ 60/299; 181/282; 180/89.2
[58] Field of Search ............ 60/299, 272; 181/282; 180/89.2

[56] References Cited

U.S. PATENT DOCUMENTS

| | | | |
|---|---|---|---|
| 4,349,078 | 9/1982 | Shimada et al. | 60/299 |
| 4,433,542 | 2/1984 | Shimura | 181/282 |
| 5,198,625 | 3/1993 | Borla | 181/282 |
| 5,464,952 | 11/1995 | Shas et al. | 180/89.2 |
| 5,521,339 | 5/1996 | Despain et al. | 60/299 |
| 5,545,860 | 8/1996 | Wilkes et al. | 181/282 |

*Primary Examiner*—John T. Kwon
*Attorney, Agent, or Firm*—Gray Cary Ware & Freidenrich

[57] ABSTRACT

A heat shield device is described, in particular for shielding heat-radiating parts, such as engines, mufflers, catalytic converters and the like, in which at least one heat shield is provided that partially surrounds the heat-radiating part to be shielded, and at least the surface of the heat shield toward the heat radiator is surface improved in such a way that a roughness of steady course is attained, and heat rays striking the surface of the heat shield are reflected at most a single time.

14 Claims, 4 Drawing Sheets

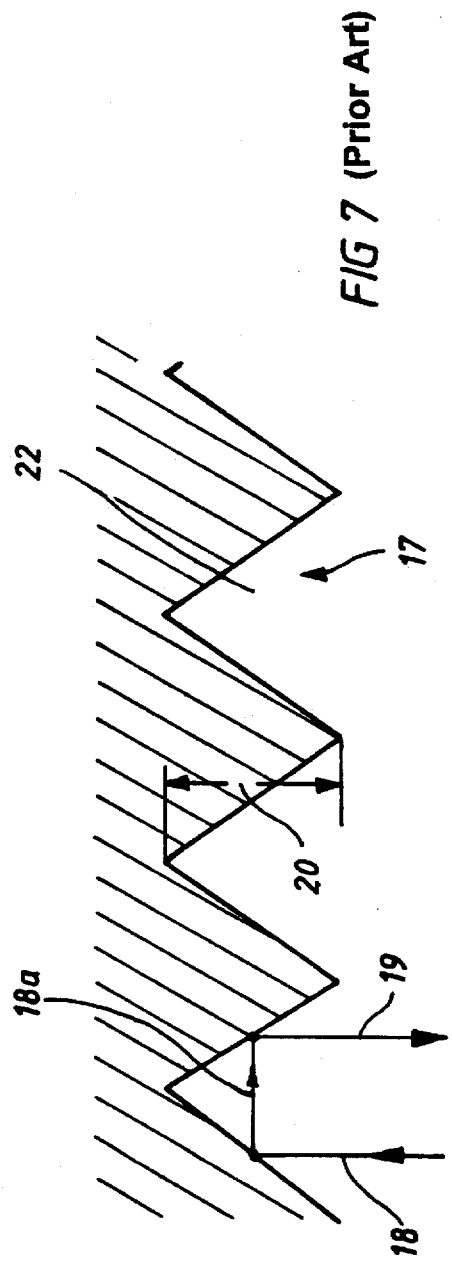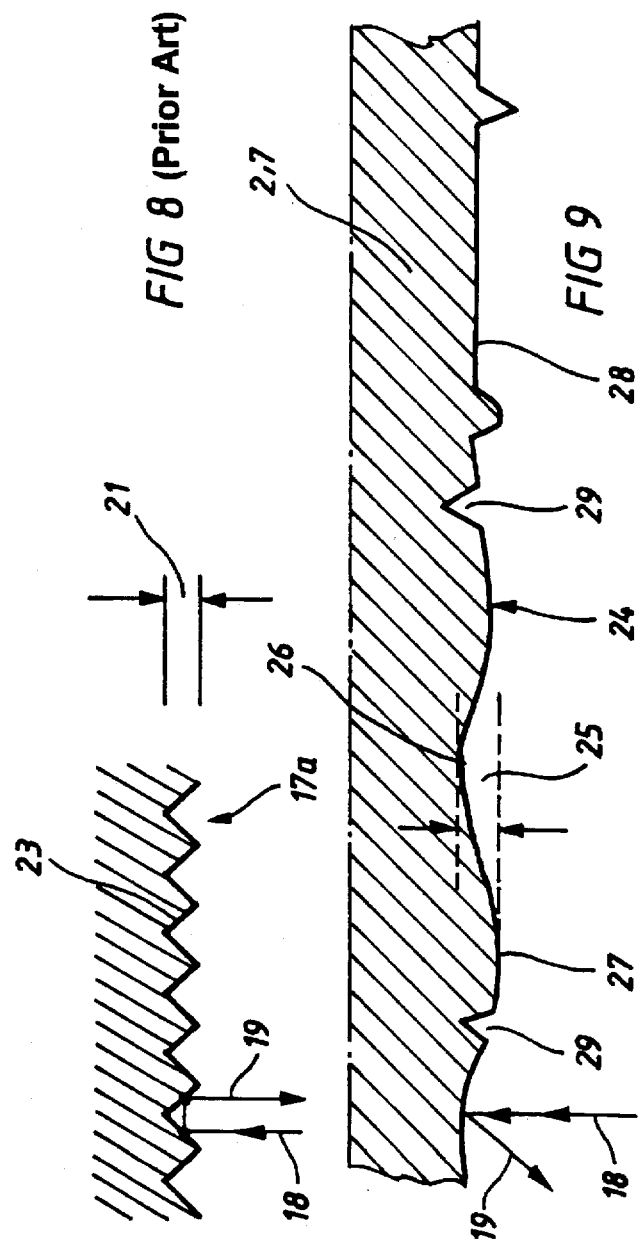

HEAT SHIELD DEVICE

BACKGROUND OF THE INVENTION

The subject of the invention is a heat shield device, in particular in its application for heat shielding of heat-radiating parts, especially motor vehicle parts, such as engines, mufflers, catalytic converters, and the like.

With the subject of German Utility Model G 91 03 864 or U.S. Pat. No. 4,703,159, heat shield devices have been disclosed that substantially comprise foils placed stackwise one above the other, which have bumps or the like in order to achieve a spacing effect between the foils.

By using a plurality of foils stacked one above the other and suitably provided with bumps, the goal is to create an air space within the stack that serves the purpose of heat shielding.

Such a structure is extraordinarily complicated and expensive to make and can easily be damaged. If damage occurs, the insulating effect of the device is lost. Due to the use of relatively thin foil material in the range of about 0.05 mm thick, the stack of foils can easily be damaged by external mechanical pressure, so that once again the insulating effect of the device is lost.

Moreover, there is a greater danger of corrosion in the region of the stack, because uncontrolled chemical processes and reactions can occur from splashing water or saltwater in the region between the foil layers.

A further disadvantage also exists that as a result of the shaping of the relatively thin-walled foils, wherein 7 to 10% of the shaping is under the influence of heat, coarse crystalline structures are created which considerably reduce the corrosion resistance.

Moreover, this considerably shortens the service life of the device.

SUMMARY OF THE INVENTION

The object of the invention is to manufacture a heat shield device of the type referred to above that may have substantially lower production costs, an improved performance over time, better corrosion resistance, improved resistance to vibration, and a lighter weight.

Moreover, at least equal or better temperature insulation than conventional heat shield devices should be provided.

An essential characteristic of the invention is that the heat shield device may be merely one metal plate that is used as the heat shield, that plate may have a half-open construction which surrounds the component to be shielded. The plate surface of this metal plate may have a corrugated structure on the micrometer range on at least one side but preferably on both sides.

It is important that the roughness of this corrugated shape have a steady course; that is, there should be no sharp points and notches, and the roughness should be in the range of a maximum of 0.5 micrometers.

A decisive feature of the technical teaching is that accordingly the flattest possible corrugation forms are achieved on the surface, and in the best case and entirely smooth surface, or in other words one practically without any fundamental or residual roughness.

Such a corrugated form can be attained by means of a surface treatment of the material, such as chromium-plating or some other coating, but also be attained by a special treatment of the surface of the metal plate itself. One such special treatment could for instance be smooth rolling out of the plate, with the goal of avoiding the notches, furrows and the like.

It is preferred that as a single shielding plate of such a heat shield device be used that is 0.5 to 1 mm thick. The sheet metal may be aluminum sheets, anodized aluminum sheets, or in particular aluminum-magnesium alloys.

The use of pure aluminum has also proved favorable, because of its service life performance and the temperature resistance.

However, it has been found that attainment of the highly smooth surface attained by rolling is made more difficult since the friction between the roller and the sheet metal becomes too small. It is therefore provided that a certain greater roughness be allowed at defined points of the sheet, thus increasing the friction to assure secure rolling. This is accomplished by allowing certain furrows and protrusions in the surface of the sheet metal and/or of embossing a bump-like structure into the surface.

Surprisingly, it has now been found that this kind of heat shield device comprising only a single surface-treated metal sheet, as described above, has the same or even better insulating capabilities than by comparison the heat shield devices of the prior art, which comprise stacked mats placed one above the other that are glued onto or rolled into a metal sheet. Hence according to the invention, the disadvantages of the heat shield devices of the prior art are also avoided. Because with the use of a single metal sheet an extraordinarily low weight is now achieved, along with a favorable service life performance and an improved corrosion performance, because such uncontrolled corrosion processes in the interstice between stacked foils placed one above the other can no longer occur. Moreover, coarse-crystalline deformations with the attendant disadvantages no longer occur. Furthermore, the vibration resistance is improved, since the single sheet has a defined vibration performance that can also be varied by suitable shaping and optionally by the provision of beads.

Since according to the invention the aforementioned expansion ranges of 7 to 10% of the starting value are avoided with a metal sheet of the invention, the coarse-crystalline deformations accordingly do not occur, either. In any event, far fewer crystalline deformations occur, because a suitably thick sheet can be used, which is not true in the prior art.

The fundamental principle of the present invention is for a heat ray striking the sheet-metal surface to be reflected directly back as from a mirror—without secondary beams or diffuse radiation, without causing crosswise beams that are associated with a crosswise arrival of a heat ray at the surface of the sheet metal and an attendant disadvantageous heating up.

The sheet-metal surface of the present invention should act practically like a mirror, which reflects arriving heat rays substantially back at the same angle or at a similar angle, without generating crosswise radiation (diffuse radiation) at the sheet-metal surface.

According to the invention, diffuse incoming heat rays at the sheet-metal surface are accordingly avoided because of the special treatment of the sheet-metal surface.

With the embodiment of the surface of this metal material in the form of a directly reflecting heat mirror in accordance with the invention, the further advantage is attained that by shaping of the shield the heat ray can be reflected back in a defined fashion in a predetermined direction. This performance is sometimes in demand, for instance because the reflected-back heat ray can be radiated along with some of the exhaust and reaches the open air but no longer heats up the exhaust itself.

In the region between the motor and the catalytic converter, however, it is on the other hand desirable for this exhaust region to be heated up as much as possible, in order to allow the action of the catalytic converter to begin quickly. In these regions it is therefore preferable that the heat mirror according to the invention be aimed directly at the exhaust system, so as to achieve constant preheating there.

Such purposeful heat reflections were not possible with the sheet-metal surfaces and the aforementioned foil package of the prior art.

It has already been indicated above that in a first simple embodiment it is sufficient for a single side of this heat shield to be equipped with the surface according to the invention.

It is preferred if two sides are so equipped, because then better efficiency is attained. However, the invention also relates to the setting up of a single surface of this heat shield.

In a further feature of the present invention, in addition to the heat shield finally treated on the surface on one or both sides, a further shielding sheet, which is located spaced apart in air by a distance that as a rule is between 2 and 5 mm from the heat shield and defines a corresponding space or cavity that is filled with air between the heat shield and the shielding sheet.

Such a shielding sheet has a thickness of from 0.1 to 0.5 mm, and preferably therefore comprises a pure aluminum or an aluminum-magnesium alloy.

In a further feature of the invention, it is contemplated that this shielding sheet also have one surface or both surfaces finally treated in the manner according to the invention. It is preferable for both surfaces, that is, the outside and the inside, to be treated in the manner according to the invention.

The invention is not limited to this, however. In the simplest case, the invention claims the improvement of a single side of the shielding sheet and likewise the improvement of a single surface of the heat shield located beneath it.

The use of two such shielding devices accordingly has the advantage that the heat radiation is further reduced, specifically by the second sheet, because the aforementioned mirror mechanisms, are located on both the inside and the outside of this second sheet which lead to a further reduction of the total heat radiation given off.

The further advantage of the second surface (use of the shielding sheet) is that if the first surface is impaired by soiling or is destroyed, a second heat-radiating surface is still present (on the shielding sheet).

When a second shielding sheet is used in combination with the aforementioned heat shield, it is also preferred for this shielding sheet to be built resiliently in the direction of the heat shield, so that indenting of the shielding sheet in the direction of the heat shield leads to a rebound of this shielding sheet to its original position.

To make the shielding sheet resilient, structure-reinforcing beads can be disposed in the shielding sheet; they are preferably embodied as crosswise beads, with the bead base preferably pointing in the direction of the space between the shielding sheet and the heat shield. It is thus achieved that when the shielding sheet is indented in the direction of the heat shield, the bead base strikes the surface of the heat shield, thus providing a certain travel limitation.

It is preferred that the crosswise beads have protrusions (bead tips) at the intersections. These tips then form a point-shaped stop face when pushing the shielding sheet in the direction of the heat shield.

The subject of the present invention results not only from the subject of the individual patent claims but also from the combination of the various claims with one another. All the indications and characteristics disclosed in the text, including the abstract, and in particular the spatial embodiment shown in the drawings, are claimed as essential to the invention, to the extent that individually or in combination they are novel over the prior art.

The invention will be described below in further detail in conjunction with drawings which show a plurality of possible embodiments. Further characteristics essential to the invention and advantages of the invention will become apparent from the drawings and their description.

BRIEF DESCRIPTION OF THE DRAWINGS

FIG. 7 is an arrangement of a sheet-metal surface of the prior art with an undesirable surface;

FIG. 8 is an arrangement similar to FIG. 7 with another undesirable surface;

FIG. 9 is a view of a a sheet-metal surface embodied according to the invention.

DETAILED DESCRIPTION OF A PREFERRED EMBODIMENT

Figure 1:
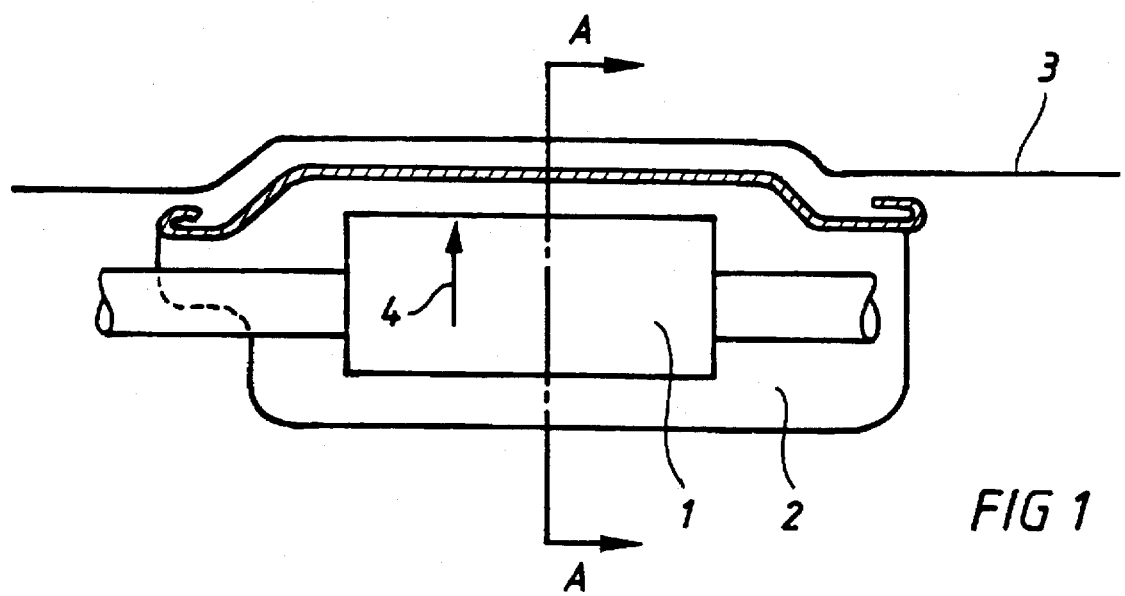
FIG. 1 is a plan view, partially in section, of a first embodiment of a heat shield device.

In FIG. 1, the cross section through an exhaust system is shown. A muffler 1 is covered at the top by the heat shield 2 according to the invention, which also extends laterally past the side faces of the muffler 1.

The radiation of heat from the muffler 1 is in the direction of an arrow 4 and is intended to be kept as much as possible away from a vehicle bottom 3 by means of the heat shield 2.

Figure 2:
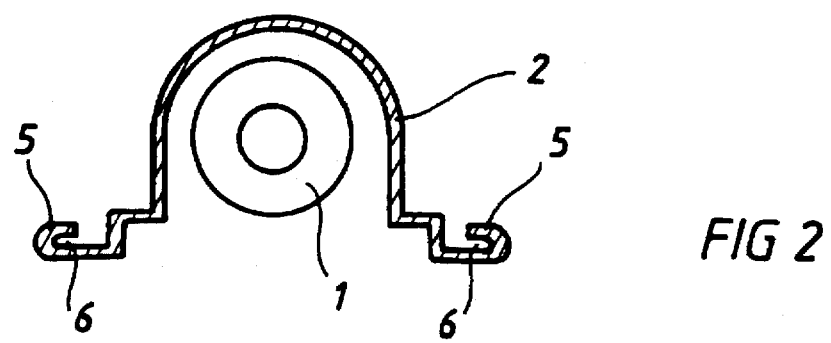
FIG. 2 is an end view, partially in section, of a first embodiment of a heat shield device.

FIG. 2 shows that the heat shield 2 is embodied of a single continuous sheet-metal part, which preferably has peripheral crimps 5 that each define one receiving chamber 6.

The invention is not, however, restricted to the provision of such crimps; such crimps may also be omitted.

Preferably, the inside and outside surfaces of the heat shield 2 are equipped with the surface described in further detail in FIG. 9.

However, it suffices also for only one of the surfaces, for instance either the inside or the outside, to have the surface according to the invention.

Figure 3:
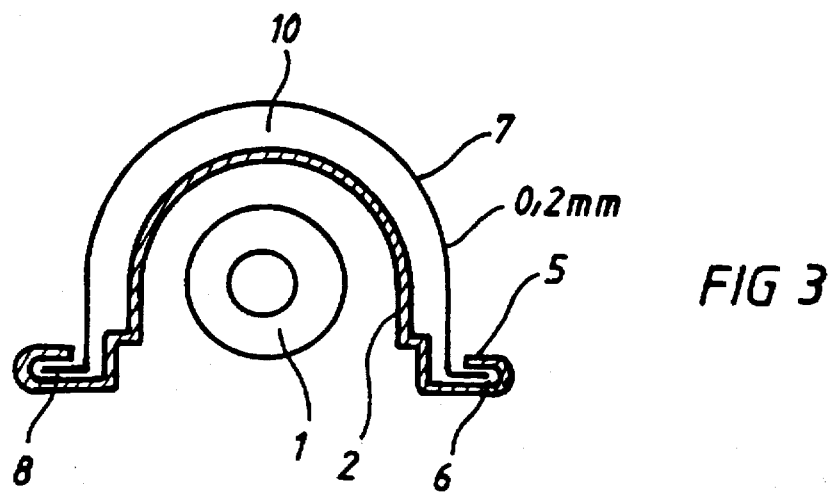
FIG. 3 is an end view, partially in section, of a second embodiment of a heat shield device.

FIG. 3 shows a second embodiment of a heat shield device of embodiment of FIG. 2 having an additional shielding sheet 7 which, with an otherwise identical construction of the heat shield 2, is folded cuffwise over the heat shield 2 and received by lateral edges 8 in the receiving chamber 6 of the heat shield 2 and firmly clamped there. An air space 10 may be formed between the outside surface of the heat shield 2 and the shielding sheet 7 that provides increased heat insulation capacity.

As mentioned above in the general portion of this specification, either both surfaces of this shielding sheet 7 or only one surface of the shielding surfaces can be equipped with the surface improvement according to the invention as shown in FIG. 9.

Figure 4:
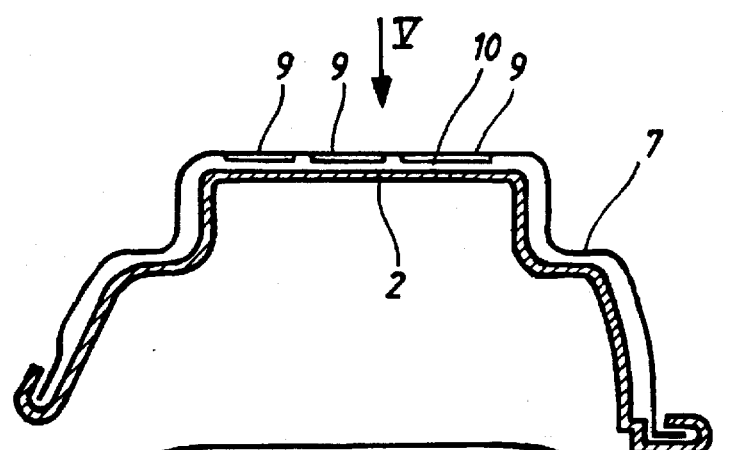
FIG. 4 is a third embodiment of a heat shield device modified over FIG. 3.

FIG. 4, illustrates a third embodiment of a heat shield device, which is a modification of FIG. 3, wherein the shielding sheet 7 can also have spacing beads 9, which protrude preferably into the air space 10 between the shielding sheet 7 and the outside of the heat shield 2.

Figure 5:
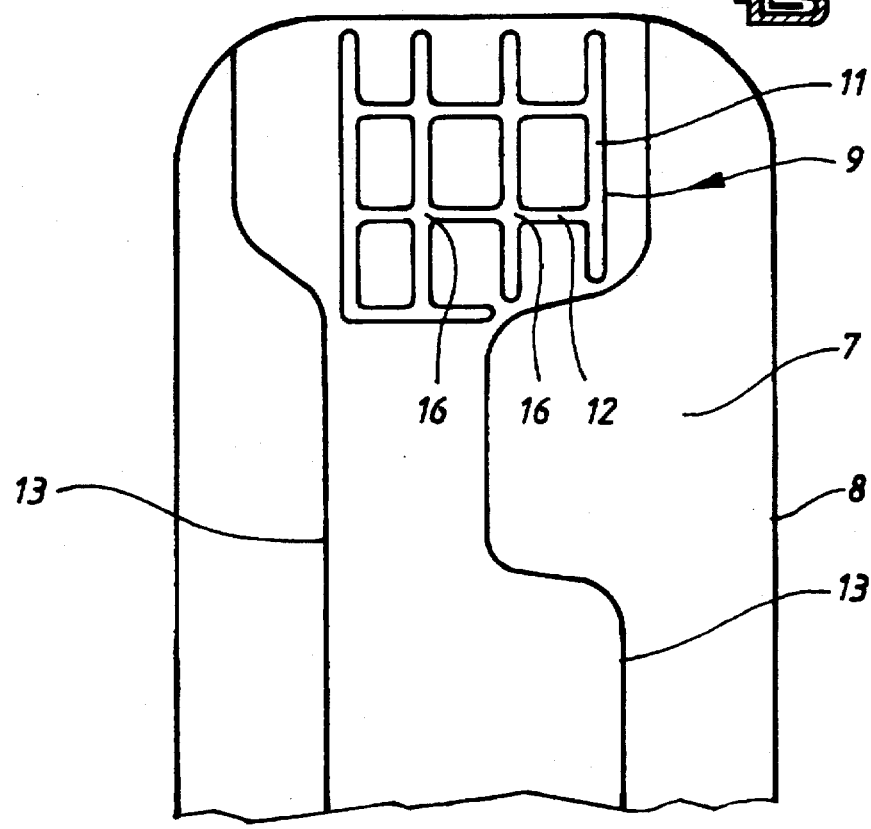
FIG. 5 is a plan view in the direction of the arrow V of FIG. 4.
Figure 6:
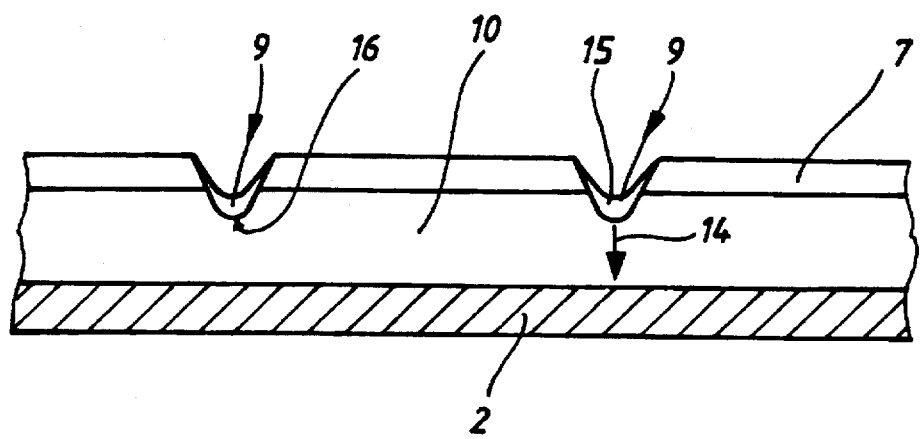
FIG. 6 is a partial sectional view of FIG. 5 through a shielding sheet with a heat shield located beneath it.

The beads 9, as shown in FIG. 5, are preferably disposed in a cross shape and comprise intersecting lengthwise and crosswise struts 11, 12 that intersect at the region of intersection points, where they form bead tips 16 that in accordance with FIG. 6 protrude farther into the air space 10 than the other regions of the beads 9.

If the shielding sheet 7 is now pushed in from outside in the direction of the heat shield 2, the bead tips 16, having a small round shape, such as a dot, disposed on each of a plurality of respective bead base 15, then strike the outer surface of the heat shield 2 located beneath in the direction of the arrow 14, and the entire shielding sheet 7 thus rebounds elastically and remains undeformed.

A permanent undesired deformation of the shielding sheet 7 is thus averted.

Also thus averted is the heat shield 2 and the shielding sheet 7 laying flat on top of one another, since in the worst case only dotlike bead tips 16 could rest on the surface of the heat shield 2.

It can also be seen from FIG. 5 that the shielding sheet 7 has corresponding bending edges 13, which provide a certain shaping or contour.

Two examples of a conventional sheet-metal surface 17, 17a that are not desirable are shown in FIGS. 7 and 8. A sheet-metal surface in accordance with the invention is shown in FIG. 9.

In FIGS. 7 and 8, it can be seen that such sheet-metal surfaces 17, 17a can be made for instance by grinding or polishing, which is precisely not desired according to the invention, because that would produce irregular marks 22, 23 caused by the grinding bodies, which are essentially V-shaped in profile and which first reflect an incident heat ray 18 crosswise in the form of the heat ray 18a and then reflect it back again as a heat ray 19.

The crosswise-reflected heat ray 18a, however, heats up the sheet-metal surface unnecessarily, which greatly reduces the heat insulation capacity.

FIGS. 7 and 8 also show that the peak-to-valley height 20, 21 is not crucial; that is, even at a relatively slight peak-to-valley height 21, as shown in FIG. 8, an undesired crosswise reflection between the heat ray 18 and the heat ray 19 takes place, so that the sheet-metal surface 17a is heated up in an undesirable way.

In the present invention as shown in FIG. 9, conversely, a sheet-metal surface 24 is proposed that avoids an undesired radiation of heat in a parallel direction or in a direction that is at a small angle from the surface. This sheet-metal surface may be used for the heat shield 2 or the shielding sheet 7.

A heat ray striking the sheet-metal surface 24 in the direction 18 is reflected in the direction of the heat ray 19, without producing heat rays 18a that are oriented parallel to or at an angle to the surface. That is, both diffuse radiation at the surface and radiation extending crosswise to the striking heat rays 18 are avoided.

In other words, the goal in any case according to the invention is to avoid a second arrival of the heat ray 18 striking the sheet-metal surface 24, and if at all possible only a single heat ray 19 should be radiated from the sheet-metal surface, without being reflected back again onto the sheet-metal surface 24.

This is where the nucleus of the present invention lies; it shows that a sheet-metal surface, however equipped, can still have a certain wariness, as illustrated by the peak-to-valley height 25. However, all this produces in the sheet-metal surface is steady transitions, so that with round radii the sheet-metal surface simply does not have the V-shaped points of the kind seen in the undesired sheet-metal surfaces of FIGS. 7 and 8.

It is important here that accordingly a peak-to-valley height 25 can be present between a corrugation trough 26 and a corrugation crest 27. Straight lines 28 may also be provided, however, which ideally meet the conditions that in fact an arrival of the heat rays 18 is reflected back again precisely in the same direction.

The inventive concept of the present invention is not departed from by the fact that in the region of the sheet-metal surface 24 still other V-shaped furrows 29 and protrusions 30 are present, which for instance represent grinding tracks or similar injuries to the sheet-metal surface, which are desirable and tolerable in defined regions of the sheet metal in order to assure the frictional engagement between the metal sheet and the roller in high-gloss rolling.

Figure 10:
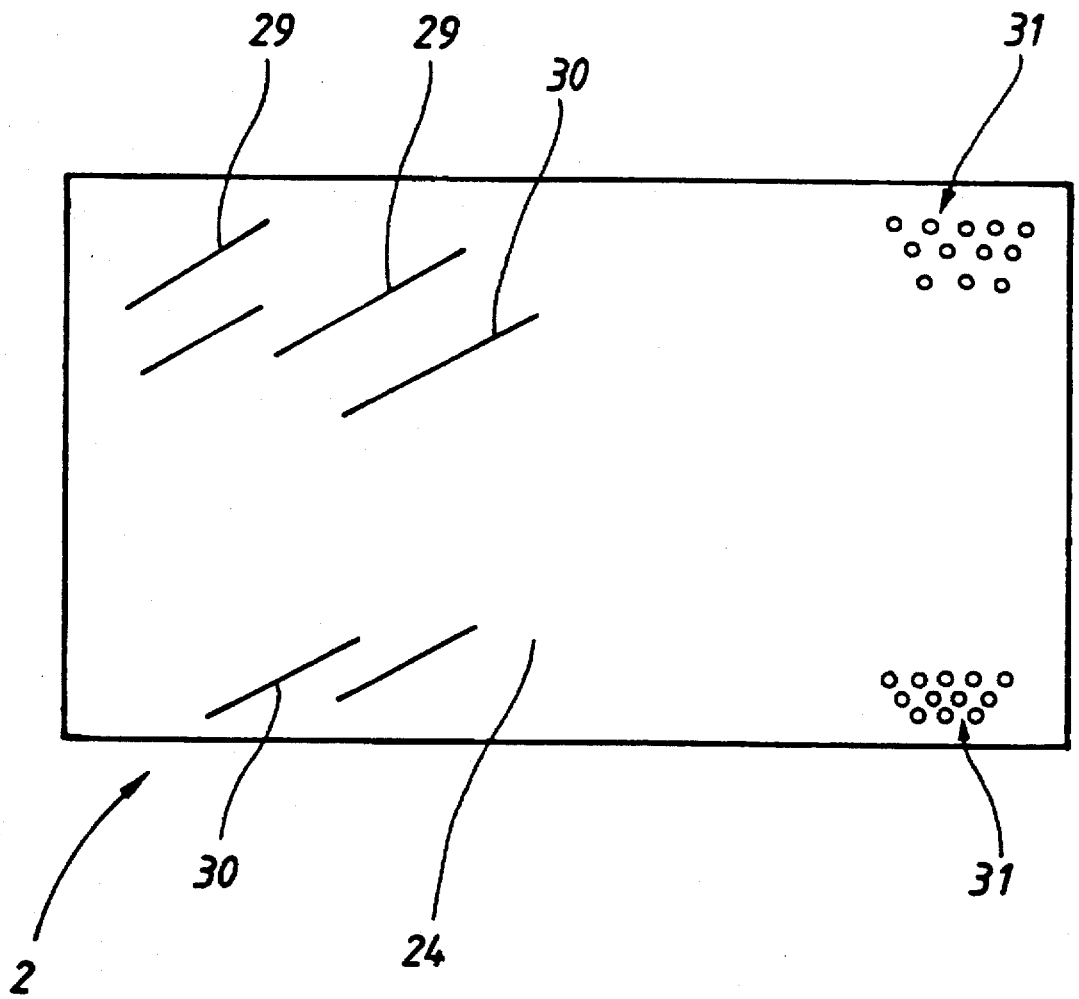
FIG. 10 is a top view of a metal sheet for a heat shield device.

The inventive concept of the present invention is not departed from if for instance 80% of a sheet-metal surface 24 according to the invention as shown in FIG. 10 has the desired reflection properties while the remainder is occupied by furrows 29 and protrusions 30, which although they do worsen the reflection properties nevertheless do so in such an insignificant way that the entire success of the present invention is still achieved.

Instead of furrows 29 and protrusions 30, it is also contemplated that fine bumps 31 be embossed into the sheet metal, in order by means of this relief to increase the friction between the sheet metal and the roller.

Hence the nucleus of the present invention resides in the fact that the predominant portion of the sheet-metal surface of the invention is equipped with the aforementioned reflective properties, involving in fact merely only the predominant portion but not the entire surface.

Such a surface can be produced for instance by rolling with specially embodied and specially improved roller surfaces; it can also be made, however, by polishing, coating, metallizing, and similar provisions that lead to the success according to the invention.

I claim:

1. A heat shield device for shielding heat-radiating parts, comprising:

a heat shield partially surrounding a heat radiating part to be shielded, a surface of the heat shield being finished to have a maximum surface roughness of approximately 0.5 micrometers so that a heat ray generated by the heat radiating part is reflected from the finished surface of the heat shield once back towards the heat radiating part to reduce the heat absorbed by the heat shield;

a shielding plate connected to the heat shield and spaced apart from the heat shield parallel to an outer surface of the heat shield, one surface of the shielding plate being finished; and the shielding plate having channels, forming lengthwise and crosswise struts, the channels having bead tips at intersection of the struts, the bead tips extending in a direction towards the heat shield in order to prevent the shielding plate from resting flat on the heat shield.

2. The heat shield device of claim 1, wherein both surfaces of the heat shield are finished to reflect a heat ray.

3. The heat shield device of claim 2, wherein both surfaces of the shielding plate are finished to reflect a heat ray.

4. The heat shield device of claim 1, wherein said surface finishing comprises a chromium plating of said surface.

5. The heat shield device of claim 1, wherein said surface finishing comprises a metalization of said surface.

6. The heat shield device of claim 1, wherein said surface finishing comprises a cold rolling of said surface.

7. The heat shield device of claim 1, wherein said heat shield comprises a crimp on two opposed sides of the heat shield wherein each crimp forms a receiving chamber.

8. The heat shield device of claim 7, wherein said shielding plate comprises a pair of opposing edges that are engaged and anchored into said respective receiving chambers on opposing sides of the heat shield.

9. The heat shield device of claim 1, wherein the heat shield has a thickness of between 0.5 and 1 mm.

10. The heat shield device of claim 1, wherein the shielding plate has a thickness of between about 0.1 and 0.5 mm.

11. The heat shield device of claim 1, wherein the spacing between the heat shield and the shielding plate is from about 2 to 5 mm.

12. The heat shield device of claim 1, wherein the heat shield comprises a furrow, a protrusion, and a bump in a defined region on the surface of the heat shield.

13. The heat shield device of claim 12, wherein the shielding plate comprises a furrow, a protrusion, and a bump in a defined region on the surface of the shielding plate.

14. A heat shield device, for shielding heat-radiating parts, comprising:

a heat shield partially surrounding a heat radiating part to be shielded, a surface of the heat shield being finished to have a maximum surface roughness of approximately 0.5 micrometers so that a heat ray generated by the heat radiating part is reflected from the finished surface of the heat shield once back towards the heat radiating part to reduce the heat absorbed by the heat shield.

\* \* \* \* \*